US012442498B2

(12) United States Patent
Kajciński

(10) Patent No.: US 12,442,498 B2
(45) Date of Patent: Oct. 14, 2025

(54) LIGHTING LUMINAIRE

(71) Applicant: SIGNIFY HOLDING B.V., Eindhoven (NL)

(72) Inventor: Jakub Kajciński, Reszel (PL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/706,605

(22) PCT Filed: Oct. 27, 2022

(86) PCT No.: PCT/EP2022/080097
§ 371 (c)(1),
(2) Date: May 1, 2024

(87) PCT Pub. No.: WO2023/073110
PCT Pub. Date: May 4, 2023

(65) Prior Publication Data

US 2025/0003561 A1 Jan. 2, 2025

(30) Foreign Application Priority Data

Nov. 1, 2021 (EP) .................................... 21205759

(51) Int. Cl.
*F21S 8/06* (2006.01)
*F21V 3/06* (2018.01)
(Continued)

(52) U.S. Cl.
CPC .............. *F21S 8/06* (2013.01); *F21V 3/0625* (2018.02); *F21V 7/0016* (2013.01); *F21V 17/104* (2013.01)

(58) Field of Classification Search
CPC ........ F21S 8/06; F21V 3/0625; F21V 17/104; F21V 7/0016
(Continued)

(56) References Cited

U.S. PATENT DOCUMENTS 7,758,207 B1 7/2010 Zhou et al.
9,512,984 B2 * 12/2016 Tessnow ................ F21V 13/04
(Continued)

FOREIGN PATENT DOCUMENTS

CN 104421692 A 3/2015
CN 210511181 U 5/2020
(Continued)

*Primary Examiner* — Laura K Tso

(57) ABSTRACT

The disclosure pertains to a lighting luminaire (10), in particular for a suspended tile light ceiling assembly, the lighting luminaire at least comprising: an elongated fixture housing (11) comprising an elongated light exit opening (14); and an elongated light exit window plate (16) structured to be mounted to the fixture housing for covering the elongated light exit opening, wherein the elongated light exit opening is bound by two longitudinal mounting slots (15*a*, 15*b*) facing each other, the longitudinal mounting slots each being configured to accommodate a longitudinal plate edge of the elongated light exit window plate, wherein the elongated light exit window plate has a width larger than a width of the elongated light exit opening, but smaller than a distance between longitudinal mounting slots facing each other, and the lighting luminaire further comprising a set of two fixating plate elements (12), each fixating plate element having two longitudinal element edges (16*a*, 16*b*) each structured to be accommodated in one of the two longitudinal mounting slots and a frontal element edge (17*c*) structured to fixate the elongated light exit window plate between the two longitudinal mounting slots through abutment against a frontal plate edge (16*c*) of the elongated light exit window plate.

11 Claims, 9 Drawing Sheets

(51) Int. Cl.
*F21V 7/00* (2006.01)
*F21V 17/10* (2006.01)

(58) Field of Classification Search
USPC .......................................................... 362/147
See application file for complete search history.

(56) References Cited

U.S. PATENT DOCUMENTS

| | | | | |
|---|---|---|---|---|
| 2006/0146531 | A1* | 7/2006 | Reo | F21V 5/008 362/249.02 |
| 2010/0157593 | A1* | 6/2010 | Zhou | F21V 29/75 362/249.02 |
| 2012/0250309 | A1* | 10/2012 | Handsaker | F21S 4/28 362/235 |

FOREIGN PATENT DOCUMENTS

| | | | |
|---|---|---|---|
| KR | 100948820 | B1 | 3/2010 |
| KR | 101609529 | B1 | 4/2016 |

* cited by examiner

LIGHTING LUMINAIRE

CROSS-REFERENCE TO PRIOR APPLICATIONS

This application is the U.S. National Phase application under 35 U.S.C. § 371 of International Application No. PCT/EP2022/080097, filed on Oct. 27, 2022, which claims the benefit of European Patent Application No. 21205759.0, filed on Nov. 1, 2021. These applications are hereby incorporated by reference herein.

TECHNICAL FIELD

The disclosure relates to a lighting luminaire, in particular for a suspended tile light ceiling assembly. Such lighting luminaires are in essence composed of an elongated fixture housing comprising an elongated light exit opening and an elongated light exit window plate, functioning as a light diffusor plate, and structured to be mounted to the fixture housing for covering the elongated light exit opening. Next to the application of such lighting luminaire in a suspended tile light ceiling assembly, such lighting luminaire can also be used in an illumination system for line illumination, wherein such illumination system for line illumination is composed of multiple lighting luminaires connected in line with each other, thereby forming a self-sustained trunked illumination system.

BACKGROUND OF THE DISCLOSURE

A lighting luminaire as outlined above, either used as a standalone light unit or in a suspended tile light ceiling assembly or in a trunked illumination system suited for line illumination, is commonly known and finds general application in illuminating large room areas, in particular office spaces, retail spaces (supermarkets), manufacturing areas, warehouses, distribution centres, etc. etc. Such lighting luminaires are composed of an elongated fixture housing and a corresponding elongated light exit window plate or light diffuser plate. Both parts can have a considerable length of 1000 mm or more.

The diffuser plates used in such lighting luminaires are typically manufactured in two ways. They are either cut from larger sheets of plastic material or are manufactured using extrusion techniques. Sheet cut diffuser plates and extruded diffuser plates can have lengths of 1000 mm and above up to 3500 mm. Whereas sheet cut diffuser plates have a flat configuration, extruded diffuser plates can be manufactured with a three-dimensional surface profile for additional light diffusing effects. Sheet cut diffuser plates are relatively inexpensive to manufacture as no significant tool investments are required, whereas extruded diffuser plates require specific machinery including a specific design of an extrusion die. A sheet cut diffuser plate requires either a simple assembly to the elongated fixture housing by means of sliding in, or with the use of additional fixing parts, for example screws or brackets. Extruded diffuser plates can also be slid-in, but the extruded profile of the plate has usually a snap interface, that snaps with the fixture housing.

Sliding in a sheet cut diffuser plate or an extruded diffuser plate element having lengths of 1000 mm or more is cumbersome on the assembly line as it doubles the footprint of the assembly table. Also the on-site replacement of a slide-in diffusor plate of an already installed lighting luminaire is equally cumbersome and complex. In addition, an extruded diffuser plate requires tooling and high-volume production batches for being cost-effective.

In addition, the above known examples of a lighting luminaire require high manufacturing tolerances of both the fixture housing as well as the diffuser plate. It is thus desirable to present a lighting luminaire, which is easy to assembly and disassembly not requiring high manufacturing tolerances.

U.S. Pat. No. 7,758,207B1 discloses a lightweight LED lamp.

SUMMARY OF THE DISCLOSURE

The disclosure proposes a lighting luminaire, in particular for a suspended tile light ceiling assembly, the lighting luminaire at least comprising an elongated fixture housing comprising an elongated light exit opening; and an elongated light exit window plate structured to be mounted to the fixture housing for covering the elongated light exit opening, wherein the elongated light exit opening is bound by two longitudinal mounting slots facing each other, the longitudinal mounting slots each being configured to accommodate a longitudinal plate edge of the elongated light exit window plate, wherein the elongated light exit window plate has a width larger than a width of the elongated light exit opening, but smaller than a distance between longitudinal mounting slots facing each other, and the lighting luminaire further comprising a set of two fixating plate elements, each fixating plate element having two longitudinal element edges each structured to be accommodated in one of the two longitudinal mounting slots and a frontal element edge structured to fixate the elongated light exit window plate between the two longitudinal mounting slots through abutment against a frontal plate edge of the elongated light exit window plate.

The frontal element edge is further structured to fixate and center the elongated light exit window plate between the two longitudinal mounting slots in a cross direction transverse to a longitudinal direction through abutment against both longitudinal plate edges of the elongated light exit window plate, thus fixating and centering the elongated light exit window plate relative to the mounting slots, and accordingly providing a proper covering of the light exit window.

Accordingly, as the elongated light exit window plate or diffuser plate has a width larger than a width of the elongated light exit opening, but smaller than a distance between longitudinal mounting slots facing each other, an easy top-down mounting by means of tilting of the elongated light exit window plate in the elongated fixture housing is possible, and the usual sliding in technique is no longer necessary. The assembly of such lighting luminaire is less cumbersome, either at the assembly line (which now can have a reduced footprint) as well as on-site for maintenance or replacement purposes. Fixating the elongated light exit window plate or diffuser plate through abutment at their frontal plate edge with the two fixating plate elements prevents a dislodging of the diffuser plate from the longitudinal slots, which bound the light exit window without the use of additional fixing parts, for example screws or brackets. Also it is not necessary to design and manufacture diffuser plates with complex snap fit interfaces by means of extrusion.

In a preferred example, the fixating plate element has a width larger than the width of the elongated light exit window plate, but a width smaller than the distance between the longitudinal mounting slots facing each other. Accordingly, this allows a proper centering of the elongated light exit window plate between the longitudinal mounting slots, ensuring an overall covering of the light exit window without exposed light slits. It also prevents an undesired dislodging of the elongated light exit window plate from the longitudinal mounting slots and from the lighting luminaire accordingly.

In a particular example, the fixating plate element has a width equal to the distance between the longitudinal mounting slots facing each other, also further guaranteeing a proper centering of the fixating plate element within the slots and relative to the elongated light exit window plate.

Preferably, the fixating plate element has a profiled frontal element edge that is complementary shaped to a profiled frontal plate edge of the elongated light exit window plate, thus forming mutually matching profiles. For example, the profiled frontal element edge or the profiled frontal plate edge is partly or fully convexly profiled and the profiled frontal plate edge or the profiled frontal element edge is complementary concavely profiled. This ensures a proper abutment over the full width dimension of both the elongated light exit window plate and the interacting fixating plate element, thus guaranteeing the fixating and centering relative to the mounting slots.

In particular, the profiled frontal element edge and the profiled frontal plate edge are symmetric along a longitudinal direction of either fixating plate element and elongated light exit window plate. Herewith the assembly of both the fixating plate elements and the elongated light exit window plate is simplified, and its mounting can be achieved irrespective of their side orientation.

In an example, the profiled frontal element edge or the profiled frontal plate edge is provided with at least two (convex) protrusions and the profiled frontal plate edge or the profiled frontal element edge is provided with at least two complementary (concave) recesses.

For cost effective reasons as well for ensuring uniform optic features, the fixating plate element and the elongated light exit window plate are made from the same light transmissive material. Accordingly, the light emission from the lighting luminaire is not different for the separate elements, which cover the light exit window, further improving its overall appearance to a user.

The lighting luminaire further comprises at least one light emitting element accommodated in the elongated fixture housing, the elongated fixture housing is provided with power electronics for supplying power to the at least one light emitting element.

The disclosure also pertains to a kit of parts comprising an elongated light exit window plate and at least two fixating plate element according to the disclosure.

BRIEF DESCRIPTION OF THE DRAWINGS

The disclosure will now be discussed with reference to the drawings, which show in.

DETAILED DESCRIPTION OF THE DRAWINGS

Figure 1:
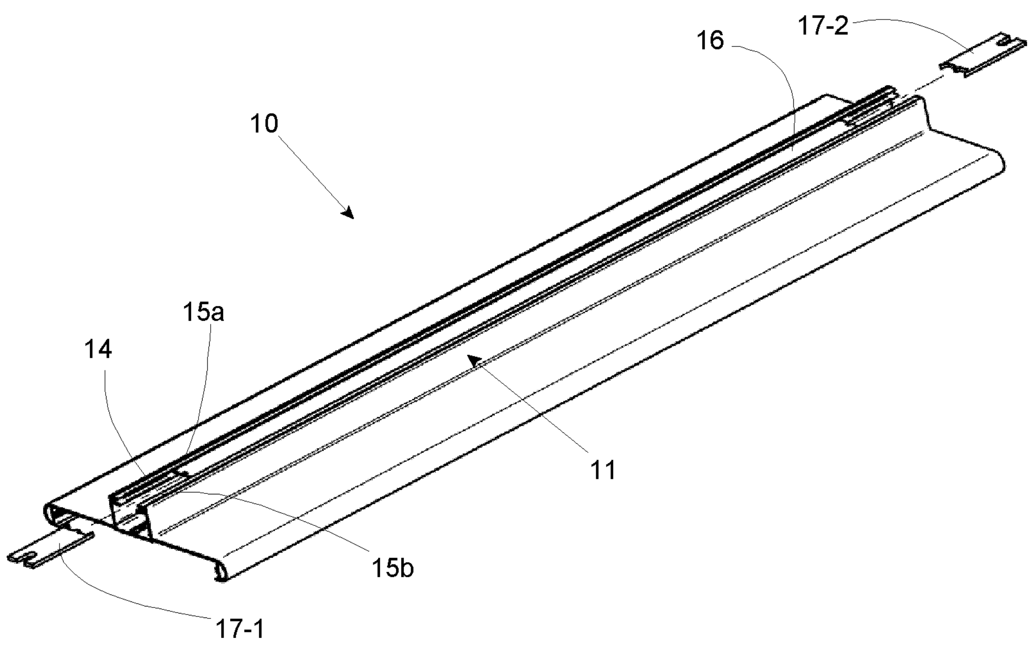
FIG. 1 a non-exemplary example of a lighting luminaire according to the disclosure.
Figure 2:
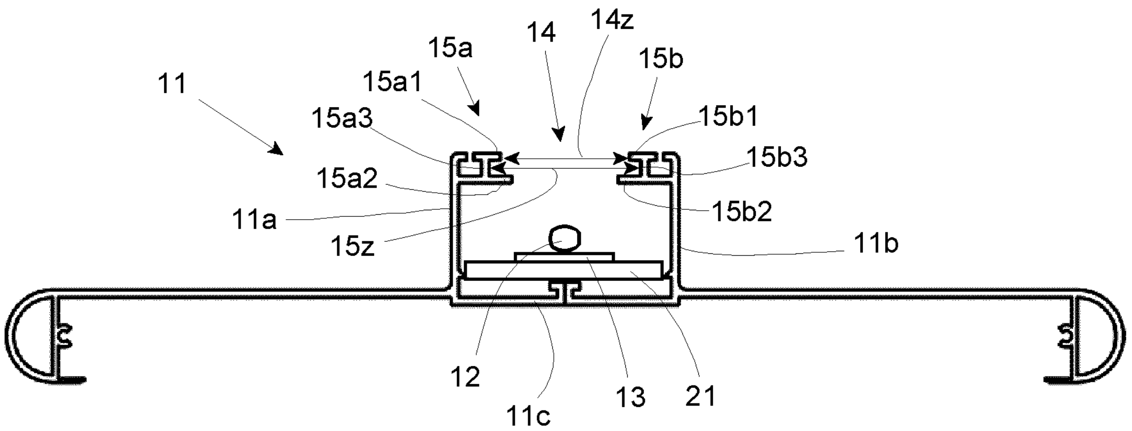
FIGS. 2-8D various details of non-exemplary examples of a lighting luminaire according to the disclosure.

For a proper understanding of the disclosure, in the detailed description below corresponding elements or parts of the disclosure will be denoted with identical reference numerals in the drawings.

The disclosure proposes in FIG. 1 a lighting luminaire, which is denoted with reference numeral 10. The lighting luminaire 10 is disclosed in this description in a non-exemplary manner. In this particular example, the lighting luminaire 10 is configured as an elongated plate shaped tile luminaire for use a suspended tile light ceiling assembly (not shown). However, a lighting luminaire according to the disclosure above can also be used as a standalone light unit or in a trunked illumination system suited for line illumination. Such lighting luminaires are commonly known and find general application in illuminating large room areas, in particular office spaces, retail spaces (supermarkets), manufacturing areas, warehouses, distribution centres, etc. etc. In general, these lighting luminaires are composed of an elongated fixture housing and a corresponding elongated light exit window plate or light diffuser plate. Both parts can have a considerable length of 1000 mm or more.

The present disclosure, and in particular the non-exemplary example of FIG. 1 and its detailed views of FIGS. 2-8, proposes a lighting luminaire, which is easy to assembly and disassembly not requiring high manufacturing tolerances.

Returning to FIG. 1 and also referring to the FIGS. 2-8 for additional details, the non-exemplary example of the lighting luminaire 10 is composed of an elongated fixture housing 11. The elongated fixture housing 11 is formed as a U-profile having a base part 11*c* and first and second side parts 11*a* and 11*b*. The first and second side parts 11*a* and 11*b* form the legs of the U-profile and enclose a chamber or space in which one or more light emitting elements 12 are accommodated. The one or more light emitting elements or light emitting sources 12 are mounted on a substrate 21 in the elongated fixture housing 11. Power electronics or power circuitry 13 are provided for supplying electric power to the at least one light emitting element 12.

The elongated fixture housing 11 furthermore comprises an elongated light exit opening 14, allowing light being emitted by the light emitting element 12 to leave the space formed by the U-profiled elongated fixture housing 11. The elongated light exit opening 14 is bound by two longitudinal mounting slots 15*a* and 15*b*, which are each part of the first and second side parts 11*a* and 11*b*, respectively of the U-profiled elongated fixture housing 11.

The two longitudinal mounting slots 15*a* and 15*b* are each formed of two flanges 15*a*1-15*a*2 (15*b*1-15*b*2) extending parallel and at some distance from each other. Each longitudinal mounting slot 15*a* and 15*b* has a base face 15*a*3 and 15*b*3. The two flanges 15*a*1-15*a*2 (15*b*1-15*b*2) of each mounting slot 15*a* (15*b*) are orientated in the plane of the elongated light exit opening 14, and accordingly the mounting slots 15*a*-15*b* (base faces 15*a*3-15*b*3) are facing each other.

The distance between the two flanges 15*a*1-15*a*2 (15*b*1-15*b*2) of each mounting slot 15*a* (15*b*) is such that each longitudinal mounting slot 15*a* and 15*b* is capable in accommodating a first and second longitudinal plate edge 16*a* and 16*b* respectively of an elongated light exit window plate 16, see FIGS. 1, 4, 5, 6 and 7. The distance between the two flanges 15*a*1-15*a*2 (15*b*1-15*b*2) is slightly larger than a thickness of the elongated light exit window plate 16.

The elongated light exit window plate 16 functions as a light diffuser plate and is mounted to the fixture housing 11 as outlined above. Accordingly, the light diffuser plate 16 covers the elongated light exit opening 14 and provides diffused light for effectively illuminating the office space, the retail space (supermarket), manufacturing area, warehouse, or distribution centre, etc. etc., in short the area in which the lighting luminaire 10 is installed.

Known, prior art diffuser plates used in lighting luminaires are typically manufactured in two ways. They are either cut from larger sheets of plastic material or are manufactured using extrusion techniques. Sheet cut diffuser plates and extruded diffuser plates can have lengths of 1000 mm and above up to 3500 mm. Whereas sheet cut diffuser plates have a flat configuration, extruded diffuser plates can be manufactured with a three-dimensional surface profile for additional light diffusing effects. Sheet cut diffuser plates are relatively inexpensive to manufacture as no significant tool investments are required, whereas extruded diffuser plates require specific machinery including a specific design of an extrusion die. A sheet cut diffuser plate requires either a simple assembly to the elongated fixture housing by means of sliding in, or with the use of additional fixing parts, for example screws or brackets. Extruded diffuser plates can also be slid-in, but the extruded profile of the plate has usually a snap interface, that snaps with the fixture housing.

Sliding in a sheet cut diffuser plate or an extruded diffuser plate element having lengths of 1000 mm or more is cumbersome on the assembly line as it doubles the footprint of the assembly table. Also the on-site replacement of a slide-in diffusor plate of an already installed lighting luminaire is equally cumbersome and complex. In addition, an extruded diffuser plate requires tooling and high-volume production batches for being cost-effective.

Figure 5:
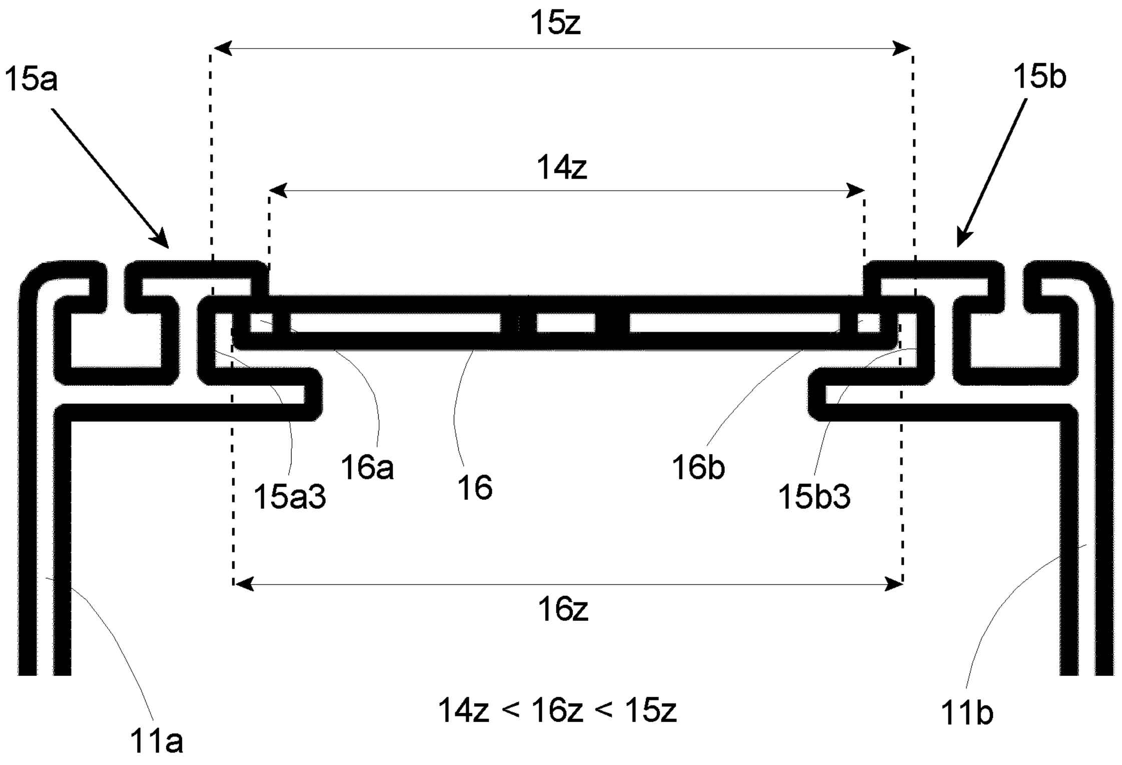

The proposed lighting luminaire according to the disclosure is easy to assembly as well as to disassembly not requiring high manufacturing tolerances. Accordingly, the elongated light exit window plate 16 has a width 16*z*, which is larger than a width 14*z* of the elongated light exit opening 14, but smaller than a distance 15*z* between the first and second longitudinal mounting slots 15*a*-15*b* facing each other. With reference to FIG. 5, distance 15*z* is defined as the distance between the two base parts 15*a*3 and 15*b*3 of the longitudinal mounting slots 15*a*-15*b* facing each other.

Accordingly, distance 14*z*<distance 16*z*<distance 15*z*.

As the elongated light exit window plate or diffuser plate 16 has a width 16*z*, which is larger than a width 14*z* of the elongated light exit opening 14, but smaller than a distance 15*z* between longitudinal mounting slots 15*a*-15*b* facing each other, an easy top-down mounting by means of tilting of the elongated light exit window plate 16 in the elongated fixture housing 11 is possible, and the usual sliding in technique is no longer necessary. These mounting steps are shown in FIGS. 3 and 4.

As shown in the Figures, one of the flanges 15*a*2 (15*b*2) of each longitudinal mounting slot 15*a* (15*b*) located closest to the base part 11*c* of the elongated fixture housing 11 is longer than the other flanges 15*al* (15*b*1), which is facing furthest from the base part 11*c* and is facing the area in which the lighting luminaire is to be installed.

Figure 3:
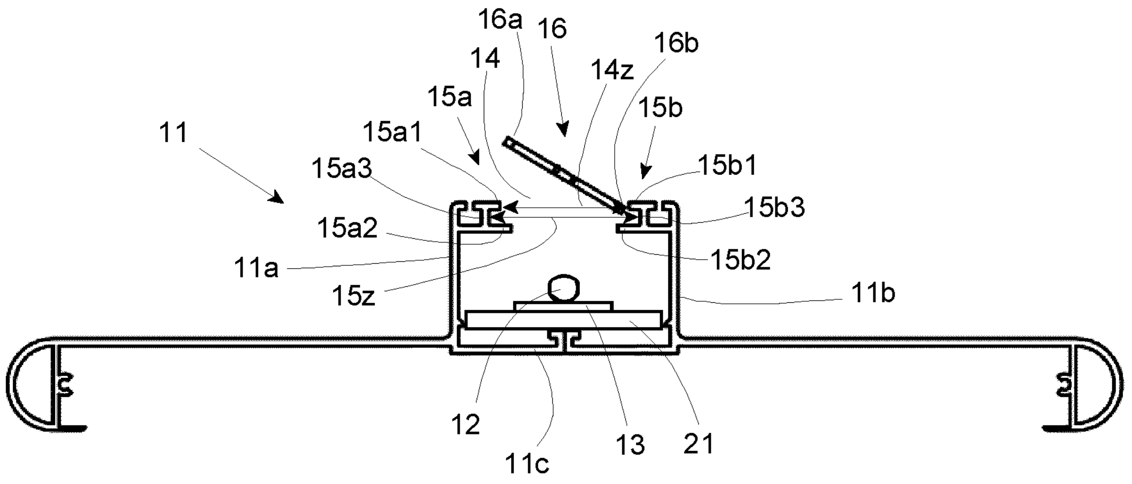
Figure 4:
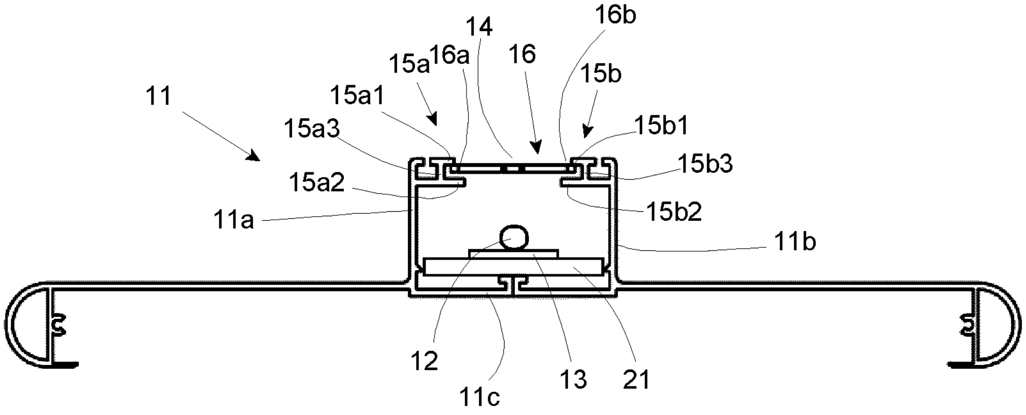

Accordingly, using a tilting technique as shown in FIG. 3, one of the first (or second) longitudinal plate edge 16*a* (16*b*) of the diffuser plate 16 can be inserted in a corresponding one of the mounting slots 15*a* (15*b*). The longitudinal plate edge 16*a* (16*b*) rests on the flange 15*a*2 (15*b*2). As the width 16*z* of the diffuser plate 16 is smaller than the distance 15*z* between both longitudinal mounting slots 15*a*-15*b*, the diffuser plate 16 can be placed with its other plate edge 16*b* (16*a*) in a resting manner on the other flange 15*b*2 (15*a*2) of the other longitudinal mounting slot 15*b* (15*a*), see FIG. 4.

Thus, the assembly of the lighting luminaire 10 according to the disclosure is less cumbersome, either at the assembly line (which now can have a reduced footprint) as well as on-site for maintenance or replacement purposes.

For fixating the elongated light exit window plate or diffuser plate 16 within the longitudinal mounting slots 15*a*-15*b*, a set of two fixating plate elements 17-1 and 17-2 is used. Each fixating plate element 17-1 and 17-2 interacts with one of the two frontal plate edges 16*c*-16*d* of the elongated light exit window plate 16. See FIGS. 1, 6 and 7. In particular, each fixating plate element 17-1 and 17-2 has first and second longitudinal element edges 17*a*-17*b*. Furthermore the thickness of the fixating plate element 17-1 and 17-2 is smaller than the distance between the two flanges 15*a*1-15*a*2 (15*b*1-15*b*2). Preferably, the thickness of the fixating plate elements 17-1 and 17-2 is the same as the thickness of the elongated light exit window plate 16.

Therefore, each first and second longitudinal element edge 17*a*-17*b* can be accommodated in one of the two longitudinal mounting slots 15*a*-15*b*. Each fixating plate element 17-1 and 17-2 has a frontal (proximal) element edge 17*c*, which proximal element edge 17*c*, when the fixating plate element 17-1 and 17-2 is mounted in the mounting slots 15*a*-15*b*, is facing a frontal plate edge 16*c*-16*d* of the elongated light exit window plate 16. A distal element edge 17*d* of each fixating plate element 17-1 and 17-2 is facing the opposite direction pointing away from the elongated light exit window plate 16.

It is preferred that the two fixating plate elements 17-1 and 17-2 together with the elongated light exit window plate 16 have a combined length, which is equal to the length of the light exit window 14 of the lighting luminaire 10. The fixating plate elements 17-1 (17-2) with the diffuser plate 16 in between can be held in place between the longitudinal mounting slots 15*a*-15*b* by means of so-called endcaps (not shown). Such endcaps can be placed over the two opposing end faces of the whole lighting luminaire 10 and abut against the distal element edges 17*d* of each fixating plate element 17-1 and 17-2. The abutting action clamps the endcaps against the two fixating plate elements 17-1 and 17-2 and accordingly clamps the elongated light exit window plate 16 in between.

The clamping action exerted in the longitudinal orientation of the light exit window 14 causes the profiled complementary edges 17*c* and 16*c*-16*d* to interface or align with each other, resulting in a proper immobilizing and centering of the elongated light exit window plate 16 between the longitudinal mounting slots 15*a*-15*b*. This ensures an overall covering of the light exit window 14 without exposed light slits. The clamping action caused by the endcaps also prevents an undesired dislodging of the elongated light exit window plate 16 from the longitudinal mounting slots 15*a*-15*b* and from the lighting luminaire 10 accordingly.

Each proximal element edge 17*c* of both fixating plate elements 17-1 and 17-2 is structured to fixate the elongated light exit window plate 16 between the two longitudinal mounting slots 15*a*-15*b*. The fixation is achieved through abutment against a corresponding frontal plate edge 16*c*-16*d* of the elongated light exit window plate 16. In short, both fixating plate elements 17-1 and 17-2 clamp the elongated light exit window plate 16 inside the mounting slots 15*a*-15*b*.

Accordingly, through abutment at the frontal plate edges 16*c*-16*d* with the two fixating plate elements 17-1 (17-2), it is prevented that the diffuser plate 16 can dislodge from the longitudinal mounting slots 15*a*-15*b*. No use of additional fixing parts, for example screws or brackets is required. Also it is not necessary to design and manufacture diffuser plates with complex snap fit interfaces by means of extrusion.

Figure 7:
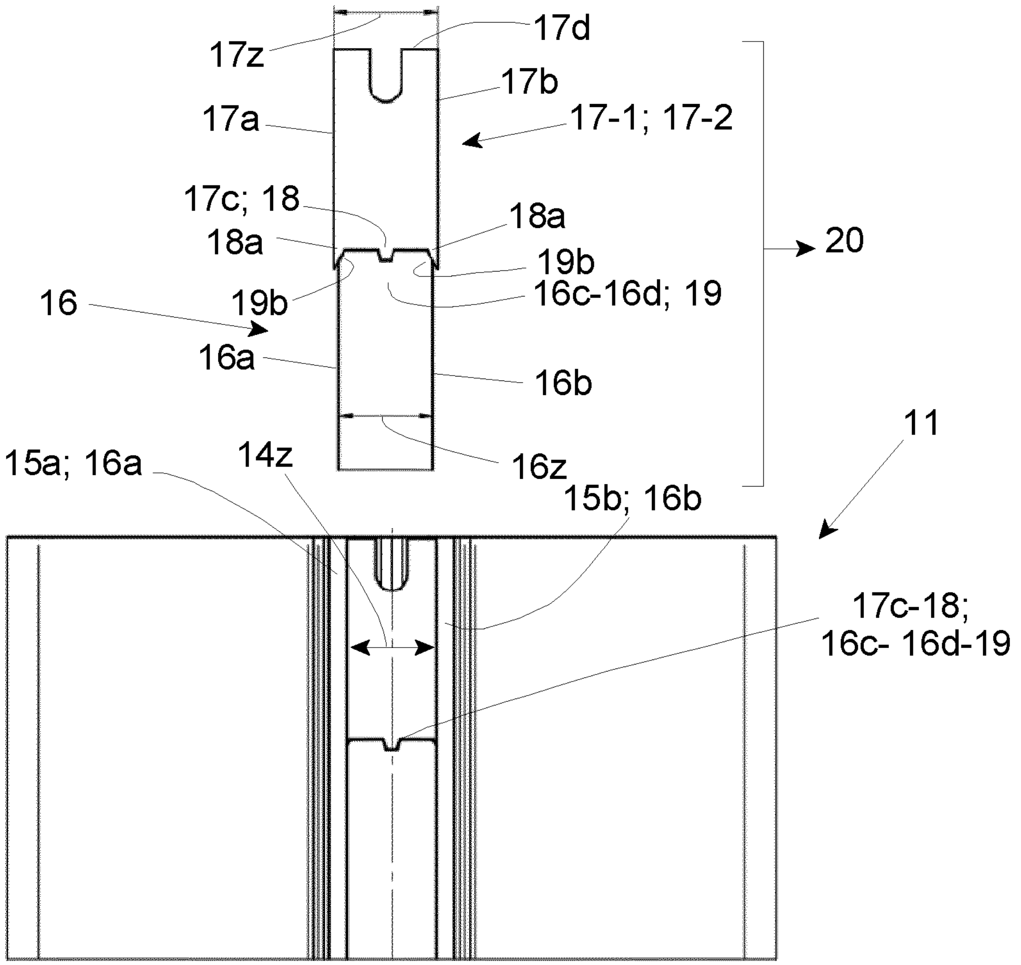

In a preferred example and as shown in more detail in FIGS. 7 and 8 (8A-8D), the fixating plate element 17-1 (17-2) has a width 17*z*, which is slightly larger than the width 16*z* of the elongated light exit window plate 16. Similarly, in order to allow a proper accommodation between the two mounting slots 15*a*-15*b*, its width 17 is smaller than the distance 15*z* between the longitudinal mounting slots 15*a*-15*b* facing each other (between both base faces 15*a*3 and 15*b*3). These dimensions as well as the abutment principle allows a proper centering of the elongated light exit window plate 16 between the longitudinal mounting slots 15*a*-15*b*. This ensures an overall covering of the light exit window 14 without exposed light slits. It also prevents an undesired dislodging of the elongated light exit window plate 16 from the longitudinal mounting slots 15*a*-15*b* and from the lighting luminaire 10 accordingly.

Each fixating plate element 17-1 (17-2) can have a width 17*z*, which is equal to the distance 15*z* between the longitudinal mounting slots 15*a*-15*b* facing each other. Also this guarantees a proper centering of the fixating plate elements 17-1 (17-2) within the mounting slots 15*a*-15*b* and relative to the elongated light exit window plate 16.

The proximal element edge 17*c* of each fixating plate element 17-1 (17-2) is provided with a specific profile 18, which is interacts through abutment with a corresponding, yet complementary profile 19 provided at each frontal plate edge 16*c*-16*d* of the diffuser plate 16. Preferably, the profiles 19 provided at each frontal plate edge 16*c*-16*d* of the light diffuser plate 16 are identical to each other, further simplifying the manufacturing thereof through sheet cutting and for symmetrical assembly purposes. In particular, the profiled proximal element edge 17*c* and the profiled frontal plate edges 16*c*-16*d* are symmetric along a longitudinal direction of either fixating plate element 17-1 (17-2) and elongated light exit window plate 13. Herewith the assembly of both the fixating plate elements and the elongated light exit window plate is simplified, and its mounting can be achieved irrespective of their side orientation. Using complementary profiles 18 and 19 on both abutting frontal (proximal) element edges 17*c* and frontal plate edges 16*c*-16*d* of the elongated light exit window plate 16 ensures a proper abutment over the full width dimension of both parts thereof, thus guaranteeing an effective and durable fixating and centering relative to the mounting slots 15*a*-15*b*.

Each profile 18 (19) can consist of extensions 18*a* (19*a*), which interact with complementary recesses or chamfers 19*b* (18*b*). In other examples, the profiles 18 and 19 can have a partly spherical configuration, which are complementary to each other.

Examples of certain profiles 18 and 19 provided at the proximal element edges 17*c* and frontal plate edges 16*c*-16*d* of both the fixating plate elements 17-1 (17-2) and the elongated light exit window plate 16 are shown in FIGS. 6, and 8A-8D.

Figure 6:
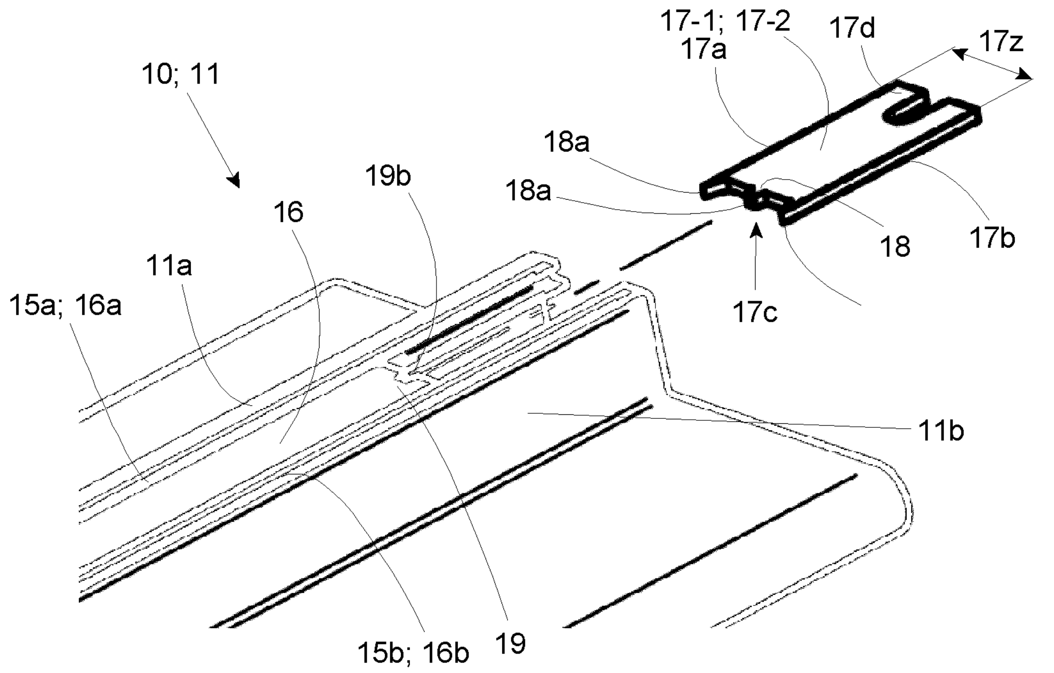
Figure 8A:
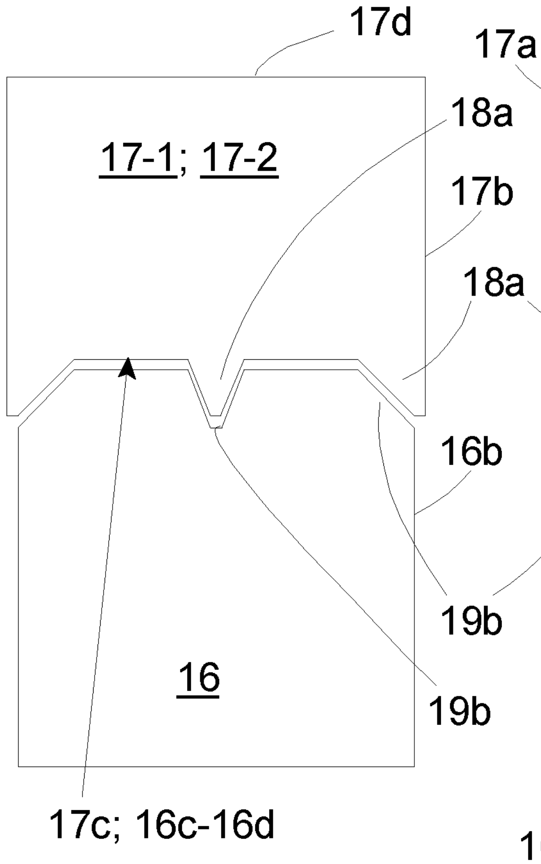

The example of FIGS. 6, 7 and 8A show a profile 18 of the proximal element edges 17*c* with three extensions 18*a*, one extension positioned in the middle (at the longitudinal axis of the fixating plate elements 17-1 (17-2)) and two at either first and second longitudinal element edge 17*a*-17*b*. Similarly, a complementary profile 19 provided at frontal plate edges 16*c*-16*d* of the elongated light exit window plate 16 consists of a centre recess 19*b* positioned in the middle (at the longitudinal axis of the elongated light exit window plate 16) and two chamfered corners 19*b* at each first and second longitudinal plate edge 16*a*-16*b*. Thus, profile 18 nicely fits or meshes to complementary profile 19 when proximal element edge 17*c* abuts with frontal plate edge 16*c* (or 16*d*), resulting in a centering of the diffuser plate 16 between the mounting slots 15*a*-15*b*.

Figure 8B:
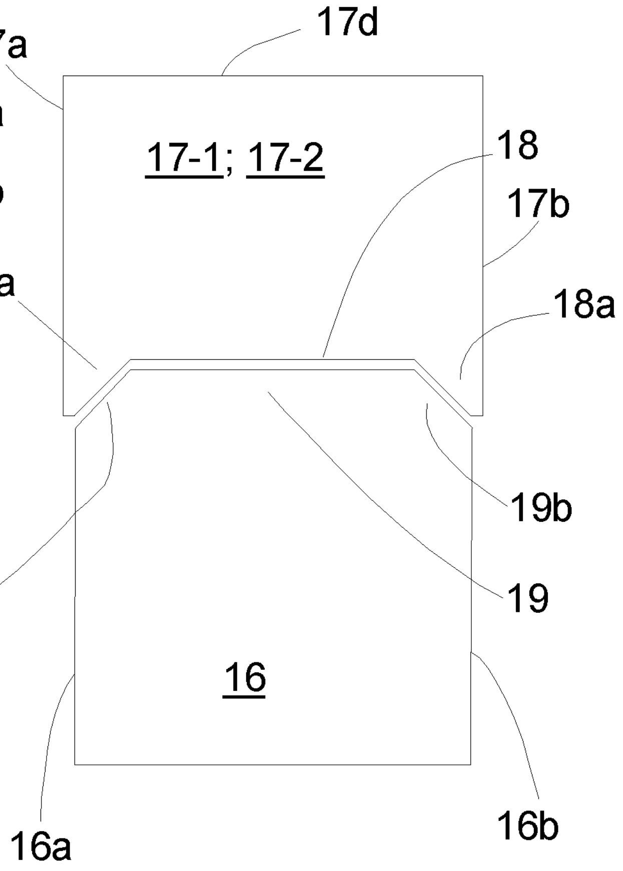

The example of FIG. 8B depicts a simpler, but also effective alternative wherein the centre extension and centre recess of both profiles are omitted. The profiled frontal plate edge has a fully convexly shaped profile 19 and the profiled frontal element edge has complementary concave profile 18.

In particular, the profiles 18-19 as depicted in FIGS. 6, 7, 8A and 8B having extensions at either first and second longitudinal element edge 17*a*-17*b* and two chamfered corners 19*b* at each first and second longitudinal plate edge 16*a*-16*b* allow a fixation of the elongated light exit window plate 16 between the two longitudinal mounting slots 15*a*-15*b* through abutment against both longitudinal plate edges 16*a*-16*b*.

Figure 8C:
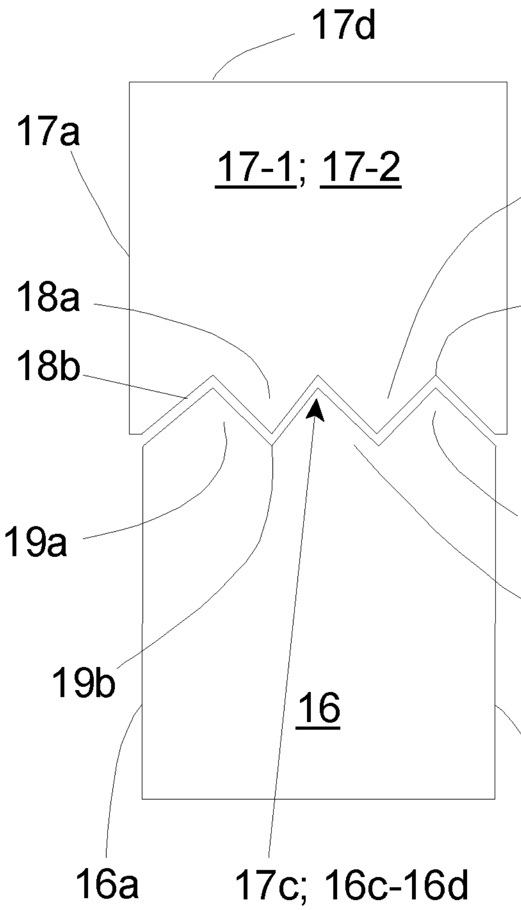

In FIG. 8C, profiles 18 and 19 are used which are shaped as complementary saw-tooths having teeth 18*a*-19*a* and valleys 18*b*-19*b*, which mesh with each other through abutment.

Figure 8D:
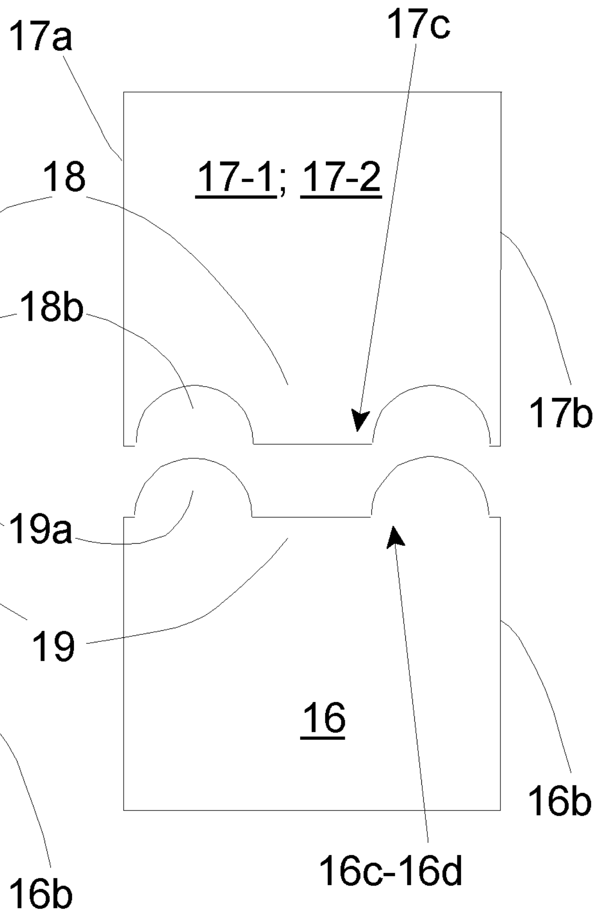

In FIG. 8D, profiles 18 and 19 are used which are shaped as complementary extending curved shapes 19*a* and receding curved bowl or basin shapes 18*b*, which likewise mesh with each other through abutment, resulting in a centering of the diffuser plate 16 between the mounting slots 15*a*-15*b*. The curved shapes can be configured as complementary semi-circles as shown in FIGS. 8D, yet other curvatures are feasible, such as elliptical, polynomial or sinusoid.

For cost effective reasons as well for ensuring uniform optic features, the fixating plate elements 17-1 and 17-2 and the elongated light exit window plate 16 are made from the same light transmissive material. Accordingly, the light emission from the lighting luminaire 10 is not different for the separate elements, which cover the light exit window, further improving its overall appearance to a user. Examples of plastic materials typically used for light diffusers are polycarbonate, PMMA (poly-methyl methacrylate), polystyrene. As an alternative material, quartz or glass can be used.

Alternatively, the fixating plate elements 17-1 and 17-2 and the elongated light exit window plate 16 can have different light transmissive characteristics. For example, the fixating plate elements 17-1 and 17-2 can be made less transparent to light due to an additive added to the plastic material, such as a dye. In such example, the fixating plate elements 17-1 and 17-2 can have a white "milky" appearance, yet in another non-transparent example the fixating plate elements 17-1 and 17-2 can be black to reduce light transmission.

In addition, certain optical structures can be applied on the surface of either the fixating plate elements 17-1 and 17-2 and the elongated light exit window plate 16 or on both, for example comprising satin structures, various micro lens structures or beam shaping structures.

Finally, FIG. 7 shows with reference numeral 20 a kit of parts comprising an elongated light exit window plate 16 and at least two fixating plate element 17-1 and 17-2, all parts having complementary profiles 18-19 and the correct dimensions, such their widths 16*z* and 17*z* and combined length dimension, depending on corresponding dimensions such as the width 14*z* and length of the light exit window 14 and the distance 15*z* between the mounting slots 15*a*-15*b* of a suitable lighting luminaire.

Such kit of parts can be used for the on-site replacement of for example slide-in diffusor plate of an already installed lighting luminaire.

LISTING OF REFERENCE NUMERALS USED

10 lighting luminaire
11 elongated fixture housing
11*a*-11*b* first and second side parts of elongated fixture housing
11*c* base part of elongated fixture housing

12 light emitting element
13 power electronics/power circuitry
14 elongated light exit opening
14*z* width of elongated light exit opening
15*a* first longitudinal mounting slot
15*a*1-15*a*2 flanges of first mounting slot
15*a*3 base face of first mounting slot
15*b* second longitudinal mounting slot
15*b*1-15*b*2 flanges of second mounting slot
15*b*3 base face of second mounting slot
15*z* distance between base faces of longitudinal mounting slots
16 elongated light exit window plate (diffuser plate)
16*a*-16*b* first and second longitudinal plate edge of elongated light exit window plate
16*c*-16*d* first and second frontal plate edge of elongated light exit window plate
16*z* width of elongated light exit window plate
17-1; 17-2 first and second fixating plate element
17*a*-17*b* first and second longitudinal element edge of fixating plate element
17*c* profiled frontal (proximal) element edge of fixating plate element
17*d* distal element edge of fixating plate element
17*z* width of fixating plate element
18 profile of profiled frontal element edge
19 complementary profile of profiled frontal plate edge
18*a*-19*a* protrusion/extension
18*b*-19*b* recess/chamfer
20 kit of parts 16 and 17-1 and 17-2
21 substrate

The invention claimed is:

1. A lighting luminaire, in particular for a suspended tile light ceiling assembly, the lighting luminaire at least comprising:

an elongated fixture housing comprising an elongated light exit opening; and an elongated light exit window plate structured to be mounted to the fixture housing for covering the elongated light exit opening, wherein the elongated light exit opening is bound by two longitudinal mounting slots facing each other, the longitudinal mounting slots each being configured to accommodate a longitudinal plate edge of the elongated light exit window plate, wherein the elongated light exit window plate has a width larger than a width of the elongated light exit opening, but smaller than a distance between longitudinal mounting slots facing each other, and the lighting luminaire further comprising a set of two fixating plate elements, each fixating plate element having two longitudinal element edges each structured to be accommodated in one of the two longitudinal mounting slots and a frontal element edge structured to fixate the elongated light exit window plate between the two longitudinal mounting slots through abutment against a frontal plate edge of the elongated light exit window plate wherein the frontal element edge is further structured to fixate the elongated light exit window plate between the two longitudinal mounting slots through abutment against both longitudinal plate edges of the elongated light exit window plate, and wherein the fixating plate element has a width larger than the width of the elongated light exit window plate.

2. The lighting luminaire according to claim 1, wherein the fixating plate element has a width smaller than the distance between the longitudinal mounting slots facing each other.

3. The lighting luminaire according to claim 1, wherein the fixating plate element has a width equal to the distance between the longitudinal mounting slots facing each other.

4. The lighting luminaire according to claim 1, wherein the fixating plate element has a non-linear profiled frontal element edge across its entire width that is complementary to a profiled frontal plate edge of the elongated light exit window plate.

5. The lighting luminaire according to claim 4, wherein the profiled frontal element edge and the profiled frontal plate edge are symmetric along a longitudinal direction of either fixating plate element and elongated light exit window plate.

6. The lighting luminaire according to claim 4, wherein the profiled frontal element edge or the profiled frontal plate edge is partly or fully convexly profiled and the profiled frontal plate edge or the profiled frontal element edge is complementary concavely profiled.

7. The lighting luminaire according to claim 4, wherein the profiled frontal element edge or the profiled frontal plate edge is provided with at least two protrusions and the profiled frontal plate edge or the profiled frontal element edge is provided with at least two complementary recesses.

8. The lighting luminaire according to claim 1, wherein the fixating plate element and the elongated light exit window plate are made from the same light transmissive material.

9. The lighting luminaire according to claim 1, further comprising at least one light emitting element accommodated in the elongated fixture housing.

10. The lighting luminaire according to claim 9, wherein the elongated fixture housing is provided with power electronics for supplying power to the at least one light emitting element.

11. A kit of parts comprising an elongated light exit window plate and at least two fixating plate elements according to claim 1.

* * * * *